United States Patent [19]

Schewe

[11] 4,006,033
[45] Feb. 1, 1977

[54] TRASH REMOVAL FROM VACUUM SYSTEM IN AN OPEN END SPINNING MACHINE

[75] Inventor: Richard A. Schewe, Rockford, Ill.

[73] Assignee: Barber-Colman Company, Rockford, Ill.

[22] Filed: Sept. 8, 1975

[21] Appl. No.: 611,400

[52] U.S. Cl. .................................... 134/6; 55/96; 55/272; 55/296; 57/56; 57/58.89; 57/156; 134/18
[51] Int. Cl.² ................ B01D 35/16; B08B 1/00
[58] Field of Search .............. 134/6, 21, 18; 55/96, 55/272, 295, 296; 57/56, 58.89, 156; 210/396

[56] References Cited

UNITED STATES PATENTS

| | | | |
|---|---|---|---|
| 3,198,663 | 8/1965 | Sohler | 134/6 X |
| 3,246,754 | 4/1966 | Sackett | 55/295 X |
| 3,762,143 | 10/1973 | Stewart | 134/21 X |

Primary Examiner—S. Leon Bashore
Assistant Examiner—Richard V. Fisher
Attorney, Agent, or Firm—A. Richard Koch

[57] ABSTRACT

A method and apparatus for removing trash from an air stream in the vacuum system of an open end spinning machine without interrupting operation of the machine. A filter removes the trash from the air stream and a traveling scraper removes the trash from the filter into a collection compartment.

18 Claims, 3 Drawing Figures

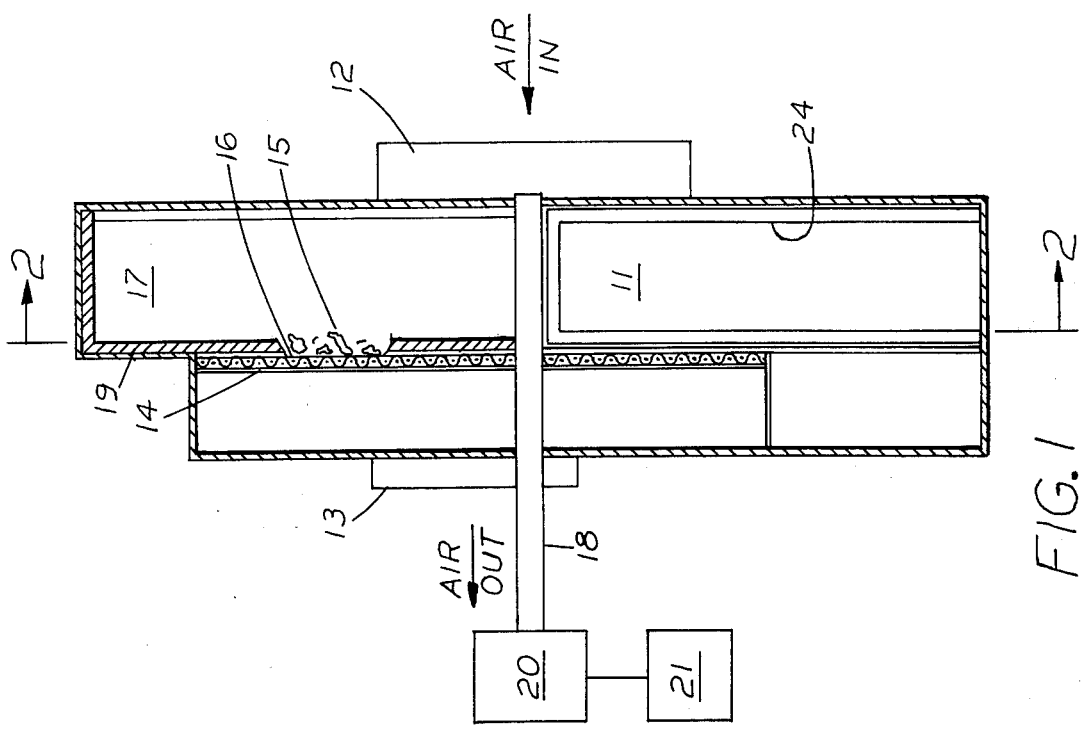
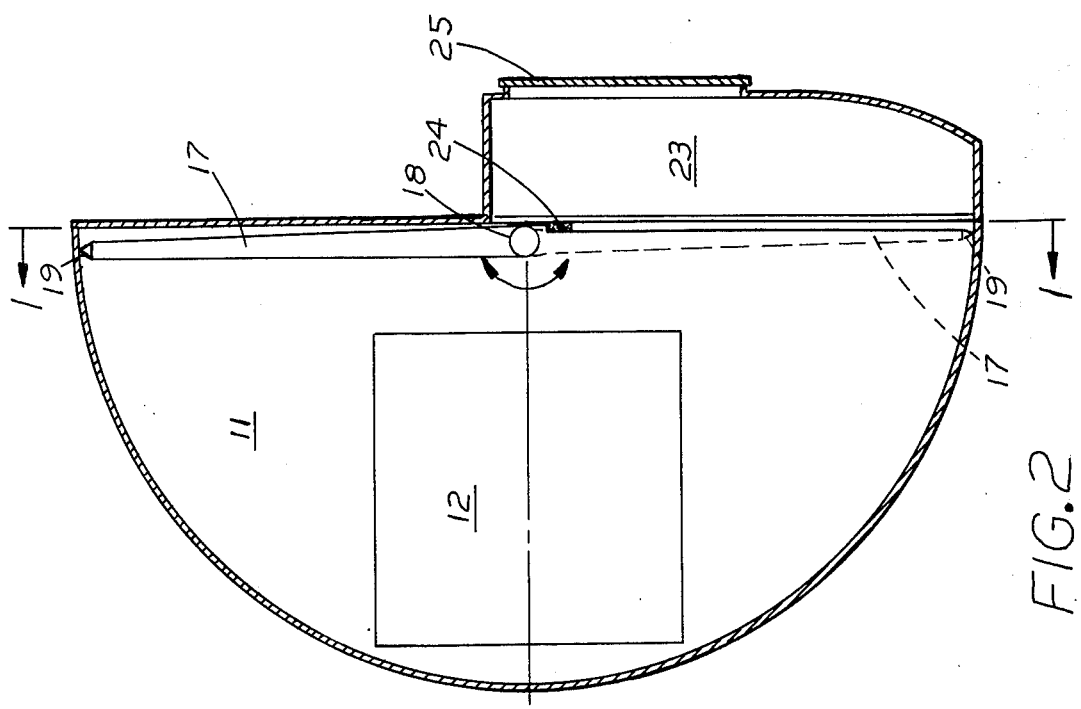

TRASH REMOVAL FROM VACUUM SYSTEM IN AN OPEN END SPINNING MACHINE

BACKGROUND OF THE INVENTION

This invention relates to open end spinning wherein a vacuum is required to carry on the spinning operation. Vacuum pressure is employed to draw fibers from the opening roll into the spinning rotor and to remove trash, such as leaves, twigs, husks, seeds, dirt and other extraneous materials from the fibers in well-known operations. Separate vacuum sources are usually employed for these operations, but a single source may be used, as disclosed in my copending patent application Ser. No. 578,352 filed on May 16, 1975. The vacuum source, or sources, is connected to a plurality of spinning units, so that if the vacuum is interrupted, or if the vacuum pressure is substantially reduced, all of the spinning units connected thereto are affected. Interruption of the vacuum at the spinning rotor will stop the spinning operation and break the thread being produced. This makes necessary the piecing-up of the thread and restarting the spinning operation at each of the plurality (often about 100) of spinning stations affected. A substantial reduction in vacuum pressure at the spinning rotor will change the quality of the thread being produced, which is unacceptable. Interruption or reduction of vacuum pressure to the cleaning chamber would permit the trash to enter the spinning apparatus, where it could stop the passage of fibers to the spinning rotor, stopping the spinning operation and breaking the thread, or it could be incorporated in the spun thread, producing a defect, which would be unacceptable.

In the past large filters have been used to separate the trash from the air stream near the vacuum source to prevent its entrance into the vacuum producing apparatus or its discharge into the atmosphere. Before these filters become sufficiently clogged to substantially reduce the vacuum pressures in the spinning and cleaning chambers, the spinning machines were shut-off, the vacuum producing apparatus was stopped, the filter chamber was opened and the trash manually scraped from the filter and removed from the filter chamber, after which the filter chamber was closed, the vacuum producing apparatus started, the spinning machines turned-on, and at each of the plurality of spinning units the thread was pieced-up and spinning restarted. This consumed a great amount of time, resulting in increased labor cost and decreased thread production.

SUMMARY OF THE INVENTION

According to the present invention the necessity for opening the vacuum duct or filter chamber while removing trash from the collection chamber is removed. Removal of trash from the collection chamber, therefore, does not require interruption of the spinning operation, thus saving the time consumed in piecing-up the thread and restarting each of the plurality of spinning units. This invention reduces labor cost and increases thread production. It removes trash from the filter periodically without attention by an operator. It reduces the size of the filter and filter chamber required.

BRIEF DESCRIPTION OF THE DRAWINGS

FIG. 1 is partially a sectional view along line 1—1 in FIG. 2 and partially schematic.

FIG. 2 is a sectional view along line 2—2 in FIG. 1.

DESCRIPTION OF THE PREFERRED EMBODIMENTS

Figure 3:
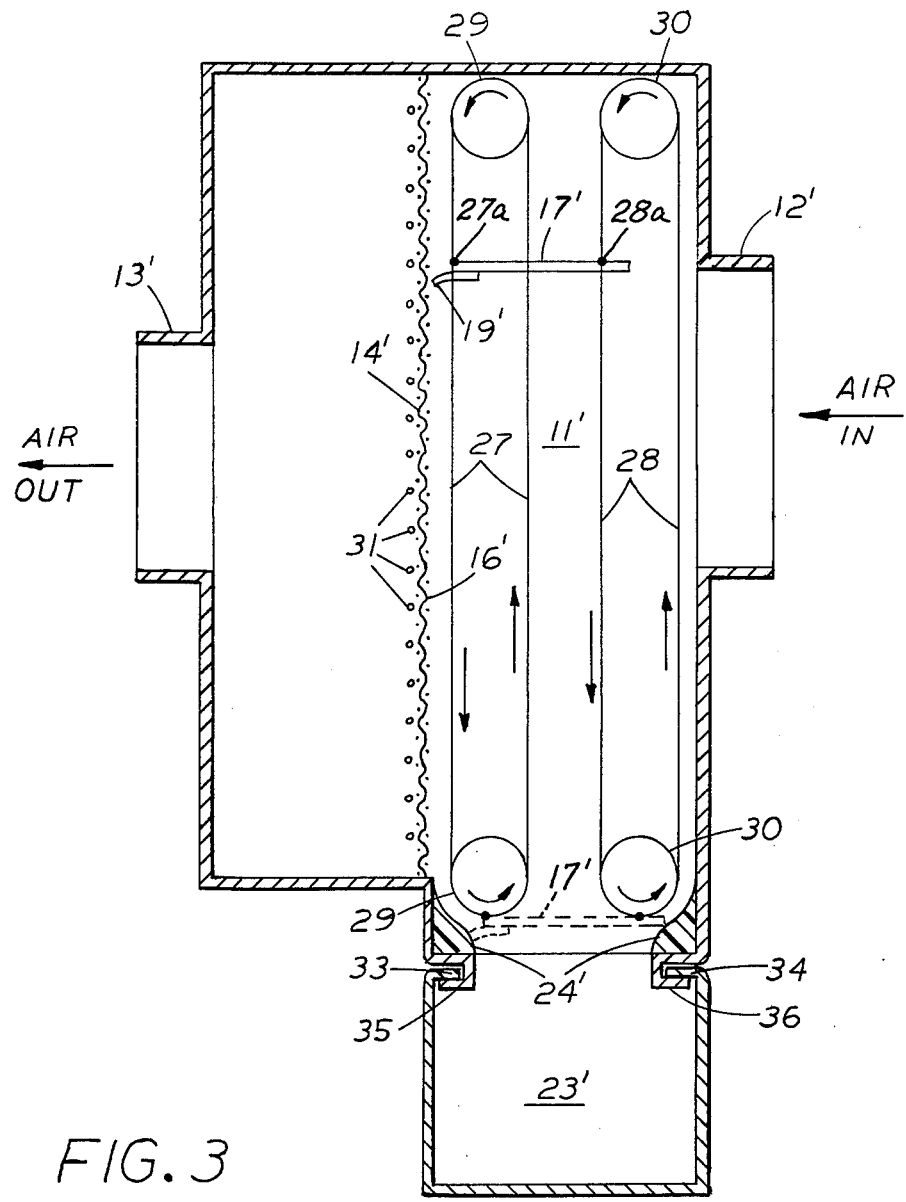
FIG. 3 is a sectional view through another embodiment of the invention.

In one preferred embodiment shown in FIGS. 1 and 2 a chamber 11 has an inlet 12 and an outlet 13 permitting an air stream to flow through the chamber. The inlet is connected to the cleaning chamber and/or the spinning chamber of each of a plurality of spinning units in an open end spinning machine (not shown). The outlet is connected to a vacuum source (not shown), which draws air from the spinning units through the chamber 11. A filter 14 interposed in the air stream through the chamber retains trash 15, carried by air entering the chamber, upon its upstream face 16, while permitting passage of the now filtered air stream through outlet 13. Periodically the trash is removed from the filter by a scraper 17, shown as a paddle affixed to a shaft 18 rotatable on its axis, which is perpendicular to the upstream face 16 of filter 14. The paddle lies in a plane substantially parallel to the air stream, so as to interpose substantially no restriction to the flow of air, which could result in a change in upstream pressure. The periods at which trash is removed are short enough so that the trash build up will not substantially interfere with air flow. Otherwise, as heretofore, a larger filter is required. As shown the paddle has a resilient wiper 19 on at least the edge engaging the filter and the paddle is of such dimensions as to substantially fill a cross-section of chamber 11 taken longitudinally through the axis of shaft 18, the chamber being semi-circular in a cross-section perpendicular to the axis. This assures that substantially all of the trash (whether on or off the filter) is removed from the chamber. The paddle 17 is normally retained in its upper position, shown in solid lines in FIG. 2, but is periodically moved by a shaft 18—rotating reversible motor 20 to its lower position, shown in dashed lines, in compliance to commands received from a programming controller 21. In one application trash removal from the filter occurs every 15 minutes. After the trash has been removed, the paddle is returned to its upper position.

The trash 15 removed from filter 14 is swept by paddle 17 into a collection compartment 23. A resilient gasket, or other sealing means, 24, when engaged with paddle 17 in its lower position, forms a substantially air-tight seal between the chamber 11 and compartment 23. While the compartment is sealed from the chamber, an access door 25 may be opened for cleaning the compartment without substantially disturbing the air flow and vacuum pressure in the chamber.

FIG. 3 shows another embodiment of the invention. Once again a chamber 11' has an inlet 12' and an outlet 13' for a stream of air and a filter 14', shown as a screen, on the upstream face 16' of which is deposited trash entrained in the incoming air stream. A scraper 17' has a wiper 19' in contact with the filter as the scraper is moved downwardly to sweep the trash from the filter into a collection compartment 23'. When the scraper is in its lowest position (shown in dashed lines) it forms a substantially air-tight seal with a gasket 24' between the chamber and the compartment, permitting accumulated trash to be cleaned out of the compartment without disturbing the vacuum pressure in the chamber. The scraper 17' is positioned in a plane substantially parallel to the air stream and moved linearly downwardly with the wiper 19' in contact with the filter 14' and upwardly with the wiper out of engagement with the filter by a pair of endless conveyors 27, 28, supported on two pairs of rollers on sprockets 29, 30. The scraper 17' is mounted on the conveyors 27, 28 as by pivots 27a, 28a located at corresponding points with respect to the conveyors such that the scraper is always maintained substantially perpendicular to the filter 14'. Motor means (not shown) drive at least one roller in each pair to move the endless conveyors synchronously. The filter screen 14' is supported by a back-up grid 31. The collection compartment 23' is shown as a drawer, having opposed flanges 33, 34 reciprocable in U-shaped tracks 35, 36 on the chamber walls. Access to the accumulated trash in the compartment is obtained by sliding the drawer open, or removing it, while the chamber is sealed off from the compartment, as described above.

The embodiments shown and described are exemplary only. It will be obvious to those skilled in the art that many equivalent constructions may be used without departing from the spirit of the invention, which is defined by the claims.

1. A method for removing trash from an air stream in the vacuum system of an open end spinning machine without interrupting the spinning operation, said method comprising the steps of filtering said trash from the air stream, scraping and sweeping said trash by a traveling scraper from the filter into a closed collection compartment without substantially impeding the flow of said air stream, substantially sealing-off said compartment from the air stream by means comprising the scraper, opening said compartment while the compartment is substantially sealed-off from the air stream, and cleaning said trash from the opened compartment.

2. A method according to claim 1 wherein said scraping occurs periodically.

3. A method according to claim 2 wherein said periodic scraping is accomplished automatically.

4. Apparatus for removing trash from an air stream in the vacuum system of an open end spinning machine without interrupting the spinning operation, said apparatus comprising a chamber having an inlet and an outlet for the air stream, a filter in said chamber for removing the trash from said air stream, a collection compartment in communication with said chamber, a traveling scraper for removing and sweeping said trash from the upstream face of said filter into the compartment without substantially impeding the flow of said air stream, means comprising said scraper forming a substantially air-tight seal between the collection compartment and said chamber, and means for selectively permitting access to the inside of said compartment for cleaning the compartment.

5. Apparatus according to claim 4 wherein said means forming the air-tight seal further comprises a member engagable by the scraper to form said air-tight seal, an engageable portion of at least one of said scraper and said member composed of resilient material.

6. Apparatus according to claim 4 wherein said scraper at an end of its travel completes the selective seal.

7. Apparatus according to claim 4 wherein said access means comprises a selectively opened closure.

8. Apparatus according to claim 4 wherein said access means comprises means for selectively moving the compartment with respect to said chamber in a manner to expose the inside of said compartment.

9. Apparatus according to claim 4 further comprising means for moving said scraper substantially in contact with the filter across the air stream and toward said compartment.

10. Apparatus according to claim 9 wherein said moving means comprises a motor programmed by a controller to periodically move said scraper in a manner to remove said trash from the filter to said compartment.

11. Apparatus according to claim 4 wherein said scraper is maintained substantially parallel to the air stream.

12. Apparatus according to claim 11 wherein said scraper comprises a paddle affixed to a shaft rotatable on an axis substantially perpendicular to the upstream face of said filter.

13. Apparatus according to claim 12 wherein a cross-section of said chamber taken perpendicular to the axis comprises a sector of a circle.

14. Apparatus according to claim 13 wherein said scraper substantially fills a cross-section of said chamber taken longitudinally through the axis.

15. Apparatus according to claim 11 further comprising means for moving said scraper linearly substantially in contact with said filter across the air stream toward said compartment.

16. Apparatus according to claim 15 wherein said means for moving moves the scraper away from said compartment out of contact with the filter.

17. Apparatus according to claim 16 wherein said means for moving comprises an endless conveyor.

18. Apparatus according to claim 4 additionally comprising means for selectively retaining said scraper in a predetermined position with respect to the filter during travel of the scraper.

* * * * *